US 7,357,997 B2

(12) United States Patent
Matsumoto et al.

(10) Patent No.: US 7,357,997 B2
(45) Date of Patent: *Apr. 15, 2008

(54) POWDER FOR UNDERLAYER OF COATING-TYPE MAGNETIC RECORDING MEDIUM AND MAGNETIC RECORDING MEDIUM COMPRISING THE SAME

(75) Inventors: Kazuyuki Matsumoto, Okayama (JP); Kenichi Inoue, Okayama (JP); Ken Inoue, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 374 days.

This patent is subject to a terminal disclaimer.

(21) Appl. No.: 10/507,915

(22) PCT Filed: Apr. 2, 2003

(86) PCT No.: PCT/JP03/04215

§ 371 (c)(1),
(2), (4) Date: Sep. 16, 2004

(87) PCT Pub. No.: WO03/088219

PCT Pub. Date: Oct. 23, 2003

(65) Prior Publication Data

US 2005/0158586 A1    Jul. 21, 2005

(30) Foreign Application Priority Data

Apr. 3, 2002    (JP)    ............................. 2002-100797

(51) Int. Cl.
*G11B 5/733* (2006.01)
*B32B 5/16* (2006.01)

(52) U.S. Cl. .................................... 428/840.2; 428/402
(58) Field of Classification Search ...................... None
See application file for complete search history.

(56) References Cited

U.S. PATENT DOCUMENTS 5,183,709 A * 2/1993 Schwab et al. ............. 428/404
5,314,750 A * 5/1994 Takedoi et al. ............. 428/402
6,063,490 A * 5/2000 Hayashi et al. ............. 428/328
6,689,452 B2 * 2/2004 Kamigaki et al. ........ 428/842.2
6,803,104 B2 * 10/2004 Hayashi et al. .......... 428/840.2
2002/0028353 A1 * 3/2002 Hayashi et al. ....... 428/694 BS
2002/0119346 A1 * 8/2002 Naoe et al. ........... 428/694 BS
2006/0166040 A1 * 7/2006 Konno et al. ............ 428/840.2

FOREIGN PATENT DOCUMENTS

| JP | 63-187418 | 8/1988 |
| JP | 4-167225 | 6/1992 |
| JP | 6-60362 | 3/1994 |
| JP | 6-139553 | 5/1994 |
| JP | 6-215360 | 8/1994 |
| JP | 7-192248 | 7/1995 |
| JP | 9-22524 | 1/1997 |
| JP | 9-170003 | 6/1997 |
| JP | 9-255341 | 9/1997 |
| JP | 10-53421 | 2/1998 |
| JP | 10-340447 | 12/1998 |
| JP | 11-273056 | 10/1999 |
| JP | 2000-143250 | 5/2000 |
| JP | 2001-176058 | 6/2001 |
| JP | 2001-243619 | 9/2001 |
| JP | 2001-297428 | 10/2001 |
| JP | 2001-344738 | 12/2001 |
| JP | 2002-74646 | 3/2002 |

* cited by examiner

*Primary Examiner*—Kevin M. Bernatz
(74) *Attorney, Agent, or Firm*—Clark & Brody

(57) ABSTRACT

A powder for an underlayer of a coating-type magnetic recording medium comprises acicular iron oxide particles having an average major axis length in the range of 20-200 nm, has a specific surface area measured by the BET method of 30-100 $m^2/g$ and has a powder pH of not greater than 7. The underlayer powder preferably contains 0.1-5.0 wt. % of P and optionally contains an amount of R (where R represents one or more rare earth elements, defined as including Y) such that R/Fe expressed in atomic percentage (at. %) is 0.1-10 at. %. The iron oxide powder enhances the properties required of a powder for forming the underlayer of a multi-layer structure coating-type magnetic recording tape, most notably the surface smoothness and strength of the tape.

2 Claims, No Drawings

POWDER FOR UNDERLAYER OF COATING-TYPE MAGNETIC RECORDING MEDIUM AND MAGNETIC RECORDING MEDIUM COMPRISING THE SAME

BACKGROUND OF THE INVENTION

1. Field of the Invention

This invention relates to a powder for an underlayer of a multi-layer structure coating-type magnetic recording medium and a magnetic recording medium using the same.

2. Background Art

Known coating-type magnetic recording media (magnetic tapes including video tapes and the like) include multi-layer structure types consisting of a magnetic layer composed of magnetic powder dispersed in resin, a base film, and a nonmagnetic layer composed of nonmagnetic powder dispersed in a resin that is located between the magnetic layer and the base film as an underlayer. Use of such a multi-layer structure improves the electromagnetic conversion characteristics of the magnetic recording medium to enable high recording density. The reliability of the tape is also enhanced owing to improved durability. In this specification, the terms "powder for underlayer" and "underlayer powder" are used to mean a powder for forming the nonmagnetic layer (underlayer) of such a multi-layer structure coating-type magnetic recording medium.

The incessant rise in information volume in recent times has increased the need for recording media with higher recording capacity and reliability. This in turn has produced a need to improve the different properties of the underlayer powder used to fabricate multi-layer structure coating-type magnetic recording media. The basic properties required of an underlayer powder include ability to form an underlayer with high surface smoothness when applied to the base film and the ability to produce an underlayer composed of a film coating having high strength.

An underlayer having a smooth surface enhances the smoothness of the overlaid magnetic layer, making it possible to obtain a magnetic recording medium having excellent electromagnetic conversion characteristics that enable high recording density. Strength enhancement of the underlayer is desirable because the thinner tape thicknesses necessitated by rising tape capacity makes it important to achieve high recording density and for this to ensure the dimensional stability of the tape per se and the strength of the tape coating. A stronger underlayer helps to upgrade reliability by boosting the strength of the tape proper.

In order to satisfy these requirements, an underlayer nonmagnetic powder generally must have excellent dispersibility at the paint-making stage, high particle strength, and high adherence to the resin. When a coating film is applied using a nonmagnetic powder with these properties, a smooth, high-strength underlayer can be formed.

The main nonmagnetic powders conventionally used for underlayer formation are spherical titanium oxide powder and acicular iron oxide powder. Multi-layer structure magnetic recording media having an underlayer of this type include, for example ones such as set out in Japanese Unexamined Patent Publication Nos. JP Sho-63-187418A and Hei-4-167225A.

Japanese Unexamined Patent Publication Nos. JP Hei-6-60362A, Hei-6- 139553A, Hei-6-215360A, Hei-7- 192248A and Hei-9-170003A, for example, indicate characteristic values when acicular ion oxide and the like are used as nonmagnetic powder for underlayer formation in such multi-layer structure magnetic recording media.

Problem to be Solved by the Invention

A tape made using spherical titanium oxide as the powder for underlayer formation is low in strength compared to that in the case of using an acicular powder. On the other hand, acicular iron oxide powder has a problem in that sintering among the particles makes it impossible to obtain an underlayer with a sufficiently smooth surface.

The reason for this is thought to be as follows. Acicular iron oxide powder is obtained by high-temperature firing of acicular iron oxy-hydroxide produced by a wet reaction. As the treatment is conducted at high temperature, sintering arises among the particles and the individual particles deform. When inter-particle sintering occurs, the fabricated tape has poor surface smoothness and the strength of the coated film is degraded by the inferior adherence between the particles and the resin. Loss of particle acicularity reduces the in-plane strength of the coated film.

The technique used to overcome these problems has been to restrain sintering during high-temperature firing by incorporating one or more sinter preventing agents, typically Al and Si, into the iron oxy-hydroxide to coat it therewith. Since the sinter preventing effect is not perfect, however, existing technology is still incapable of providing an underlayer powder exhibiting satisfactory properties. Japanese Unexamined Patent Publication No. 10(1998)-241148, for example, attempts to prevent sintering by incorporating Al into the particle interiors while further coating them with at least one of Al and Si. The improvement offered by this method is, however, still insufficient.

Another reason for not being able to obtain the required tape characteristics is that the pH value of the powder particle surfaces (powder pH) is high. Iron oxy-hydroxide, the precursor used to produce an acicular iron oxide powder, is generally produced on the alkaline side. The acicular iron oxide powder produced from this starting material therefore tends to have a pH value on the alkaline side.

However, recent research shows that when an underlayer paint containing an iron oxide powder whose particles have alkaline surface is used, the components present in the paint, particularly the lubricant (fatty acid or the like), react with the powder. It has been found that when this reaction proceeds to the point that the amount of lubricant becomes insufficient, the surface properties of the tape deteriorate to increase the coefficient of friction during actual use. This lowers tape running durability. The pH of the iron oxide powder for the underlayer is therefore preferably on the acidic side. For the reason set out above, however, the underlayer iron oxide powder is generally on the alkaline side. The foregoing drawbacks arise as a result.

An object of the present invention is therefore to overcome the aforesaid problems by providing a powder for an underlayer of a multi-layer structure coating-type magnetic recording medium endowed with the required properties, particularly an underlayer iron oxide powder that improves surface smoothness and coated film strength. Another object of the present invention is to provide a multi-layer structure magnetic recording medium offering large recording capacity and high reliability.

SUMMARY OF THE INVENTION

The present invention provides a powder for an underlayer of a coating-type magnetic recording medium, which powder comprises acicular iron oxide particles having an average major axis length in the range of 20- 200 nm, has a specific surface area measured by the BET method of 30-100

$m^2/g$ and has a powder pH of not greater than 7. The underlayer powder according to the present invention preferably contains 0.1-5.0 wt. % of P and optionally contains an amount of R (where R represents one or more rare earth elements, defined as including Y) such that R/Fe expressed in atomic percentage (at. %) is 0.1-10 at. %. Use of this underlayer powder enables production of a highly durable magnetic recording medium suitable for high-density recording.

DESCRIPTION OF THE PREFERRED EMBODIMENTS

The present invention is characterized in the point that it provides and uses an underlayer powder for forming a nonmagnetic layer of a multi-layer structure coating-type magnetic recording medium, which comprises acicular iron oxide particles having an average major axis length of 20-200 nm, has a specific surface area measured by the BET (Brunauer-Emmett-Teller) method of 30-100 $m^2/g$ and has a powder pH of not greater than 7. The underlayer powder is produced from acicular iron oxy-hydroxide as a precursor. It is obtained by firing acicular iron oxy-hydroxide that has been surface treated with a phosphorus compound or a phosphorus compound and at least one rare earth metal compound.

Acicular iron oxide is obtained by high-temperature firing of acicular iron oxy-hydroxide produced by a wet reaction. As explained earlier, however, sintering arises among the particles and the individual particles deform because the treatment is conducted at high temperature. It was discovered that this problem can be overcome when the iron oxide powder is obtained by firing iron oxy-hydroxide coated with a phosphorus compound or iron oxy-hydroxide coated with a phosphorus compound and at least one rare earth metal compound. It was found that this method of producing the iron oxide powder enhances the dispersion of the powder particles in the resin for forming the underlayer, thereby improving the surface smoothness of the tape, alters the nature of the iron oxide particle surface properties owing to the presence of P or P and R on the particle surfaces, and enhances the adherence between the particles and the resin.

In the past, attempts were made to upgrade sinter preventing effect by dissolving Al or the like into the iron oxy-hydroxide particles. When another element is present in solid solution within the iron oxy-hydroxide particles, however, the dewatering temperature at which the iron oxy-hydroxide becomes iron oxide shifts to the high temperature side, so that firing has to be conducted at a higher temperature. In the present invention, no additional element is incorporated into the iron oxy-hydroxide particles. Rather, the particles are fired after their surfaces have been coated with a phosphorus compound or a phosphorus compound and at least one rare earth metal compound. This enables the dewatering reaction to proceed from a low temperature, so that the firing temperature can be set low to inhibit interparticle sintering. It was found that coating with only a phosphorus compound. improves the sinter preventing effect over that obtainable with the conventional method of incorporating Al or Si but that a combination of a phosphorus compound and at least one rare earth metal compound produces an outstanding effect as a sinter preventing agent.

When an iron oxide powder that has been surface processed with a phosphorus compound and optionally also with at least one rare earth metal compound is used as a powder for forming a tape underlayer, the tape underlayer is improved in both surface smoothness and durability. Then, when a very thin magnetic layer is applied onto the underlayer, it also exhibits excellent surface smoothness. This makes it possible to obtain a magnetic tape having excellent electromagnetic conversion characteristics and good strength even in a thin-layer tape. The invention underlayer powder of this type is thus highly suitable for use in a multi-layer structure coating-type magnetic recording medium. It is also advantageous in the point that the powder pH of the iron oxide powder is not greater than 7.

A powder pH of not greater than 7 is one required property of the underlayer powder. A change in the powder pH affects the adsorption behavior between the powder and the lubricant in the paint. A fatty acid called a "lubricant" is added to the paints containing dispersed underlayer powder and magnetic powder used to manufacture the coating-type magnetic recording medium. In the state of the coated film, the lubricant operates to reduce interference between the tape surface and the head, thereby improving tape durability. A fatty acid, an acidic substance, is generally used as the lubricant. When the powder pH of the underlayer powder is on the alkaline side, therefore, a reaction tends to proceed in the paint between the underlayer powder and the acidic lubricant. When this happens, the lubricant cannot perform its intended function. The underlayer powder used is therefore preferably one having a surface property that does not give rise to adsorption with the fatty acid. Specifically, the underlayer powder preferably has a pH of not greater than 7, more preferably a pH on the acidic side.

Since the underlayer powder according to the present invention is obtained by firing iron oxy-hydroxide coated with a phosphorus compound, it has a powder pH of not greater than 7 and therefore does not degrade the action of the lubricant in the aforesaid manner. In addition, it was found to markedly improve compatibility with the paint and, by this, to provide a further improvement in tape surface smoothness and running durability beyond that attributable to the aforesaid sinter preventing action. However, notwithstanding that it is a feature of the present invention that the underlayer powder has a pH of not greater than 7, an excessively low pH should be avoided to preclude undesirable effects on surrounding substances (e.g., the metal magnetic powder of the magnetic layer). The pH should therefore be not less than 3, preferably not less than 4. Thus the powder pH of the underlayer powder according to the present invention is preferably in the approximate range of 4-7.

The underlayer powder according to the present invention preferable has an average major axis length (value obtained by averaging the measured major axis lengths of 100 particles randomly selected from within the field of a transmission electron micrograph) of 20-200 nm, preferably 50-160 nm, more preferably 50-120 nm. Generally speaking, the smoothness of the tape after tape production increases with decreasing average major axis length of the acicular iron oxide particles insofar as the particles can be dispersed in the paint. As the underlayer powder of the present invention is composed of particles having an average major axis length with the foregoing range, it helps to improve the smoothness of the tape surface. The axial ratio of the powder particles is preferably 2-10, more preferably 3- 8, most preferably 4-8. Owing to this high axial ratio, the particles align with the plane of the base film surface during application and, further, the particles entangle with one another. This contributes to tape surface smoothness and tape strength. The specific surface area (BET) of the invention underlayer powder is preferably 30-100 m$^2$/g, more preferably 35-80 m$^2$/g, most preferably 35-70 m$^2$/g. A specific surface area higher than 100 m$^2$/g is undesirable because the dispersion in the paint becomes poor, and one lower than 30 m$^2$/g is undesirable because the powder experiences flocculation and/or sintering.

The underlayer powder according to the present invention can be produced by firing iron oxy-hydroxide prepared in one of the following ways.

The iron oxy-hydroxide can be produced by any of various methods, including: (1) Method of passing an oxygen-containing gas at a temperature not higher than 80° C. through a suspension including an iron hydroxide colloid obtained by adding an equivalent or more of an alkali hydroxide aqueous solution to a ferrous salt aqueous solution to conduct an oxidizing reaction at a pH of 11 or greater, thereby producing iron oxy-hydroxide in the suspension; (2) Method of adding to a ferric salt aqueous solution 1.0-3.5 equivalents based on iron of an alkali hydroxide aqueous solution, producing a suspension containing the obtained ferric hydroxide colloid at 10-90° C., and hydrolyzing the suspension after it has ripened for 2 - 20 hours to produce an iron oxy-hydroxide powder; and (3) Method of passing an oxygen-containing gas through a suspension obtained by adding an alkali carbonate aqueous solution to a ferrous salt aqueous solution and optionally adding an alkali aqueous solution thereto, so as to conduct an oxidizing reaction and thereby produce iron oxy-hydroxide in the suspension.

Regardless of the method used to produce the acicular iron oxy-hydroxide, sintering during firing can be prevented by, as explained in the following, coating the particles of the iron oxy-hydroxide with a phosphorus compound and, optionally, with at least one rare earth element compound.

First, the aqueous solution in which the iron oxy-hydroxide having completed the oxidizing reaction of (1) or (3) above or having completed the hydrolysis reaction of (2) above is dispersed/suspended is put in a vigorously stirred state. A prescribed amount of a phosphorus-containing aqueous solution is added to the stirred suspension, followed by vigorous stirring. The uniformity of the coating is promoted by prolonging the stirring time following the addition. When R is also to be adhered, a prescribed amount of at least one rare earth element, which may be Y, dissolved in diluted sulfuric acid is added to the reaction vessel. In this case, too, the uniformity of the coating is promoted by vigorous stirring and prolonging the stirring time following the addition.

Another method that can be employed is to add iron oxy-hydroxide prepared beforehand to pure water, followed by stirring, and then subjecting the suspension obtained to coating treatment in the aforesaid manner. In this case, however, coating with a rare earth metal compound may sometimes be impossible because no hydroxide forms owing to the fact that the suspension is near neutral. This problem can be overcome by adding an appropriate alkali to the suspension to make the suspension alkaline.

The obtained iron oxy-hydroxide coated with the phosphorus compound and optionally the at least one rare earth element compound is filtered from the suspension and washed with water. The washing should be carried out thoroughly until the filtrate is nearly neutral. This is because unadhered phosphorus compound tends to be co-present owing to the limited amount of phosphorus compound that can adhere, and if this unadhered phosphorus compound is not thoroughly removed, the surface smoothness after tape fabrication may be degraded.

Another method that can be employed is, after obtaining the aqueous solution in which the iron oxy-hydroxide having completed the oxidizing reaction of (1) or (3) above or having completed the hydrolysis reaction of (2) above is dispersed/suspended, putting it in a vigorously stirred state, adding thereto a prescribed amount of a sulfuric acid solution of at least one rare earth element, which may be Y, and continuing the stirring. The uniformity of the coating with the at least one rare earth element, which may be Y, is promoted by stirring vigorously at the time of the addition and prolonging the stirring time following the addition. The obtained iron oxy-hydroxide coated with the at least one rare earth element compound, which may be Y, is filtered from the suspension and washed with water, whereafter phosphorus is adhered to the filtered and washed product by impregnating it with a phosphorus-containing solution of prescribed concentration, followed by washing with water and drying. The washing should be carried out thoroughly until, as mentioned above, the filtrate is nearly neutral. No particular heating temperature or other conditions are defined regarding the drying, but since the purpose is to remove the moisture content, thorough drying, even up to dewatering, can be achieved within the approximate temperature range of 80-350° C. The speed of the drying/dewatering increases with increasing temperature.

Usable phosphorus compounds include phosphoric acid, metaphosphoric acid, diphosphoric acid, and phosphates such as ammonium phosphate and ammonium dihydrogen phosphate. Irrespective of the type of phosphorus compound used, the amount of phosphorus for the coating is preferably in the range of 0.01-5.0 wt. % as the content of phosphorus in the iron oxide. When the amount is less than 0.01 wt. %, the sinter preventing effect by the phosphorus coating is insufficient for obtaining an underlayer excellent in surface smoothness and for obtaining adequate coated film strength. On the other hand, an amount of phosphorus in excess of 5.0 wt. % provides sufficient sinter preventing effect but the iron oxide powder comes to have a high specific surface area. Such an iron oxide powder is unsuitable as an underlayer powder because it cannot be thoroughly dispersed during paint preparation. In addition, free phosphorus compound that comes to be present at the time of coated film formation is incorporated into the coated film structure and has an adverse effect on the coated film. This is preferably avoided.

Usable rare earth elements are not particularly limited, i.e., the effect of the invention is observed regardless of which element(s) is/are used. However, Y and La are most suitable because they offer the greatest synergism with P in promoting the sinter preventing effect. The content of the rare earth element(s) in the iron oxide is preferably such that R/Fe expressed in atomic percentage (at. %) is in the range of 0.1-10 at. %. When R/Fe is lower than 0.1 at. %, the sinter preventing effect by the R coating is insufficient for obtaining an underlayer excellent in surface smoothness and for obtaining adequate coated film strength. On the other hand, when the amount of R exceeds 10 at. %, the coated iron oxy-hydroxide particles tend to flocculate. This should be avoided because it makes sintering likely to occur during the ensuing firing process.

The iron oxy-hydroxide surface-coated with phosphorus compound and optionally with at least one rare earth element compound in the foregoing manner is fired (baked) to obtain an iron oxide powder. The firing (baking) treatment is conducted in air at 300-900° C., preferably 400-700 ° C. A treatment time of 10-60 minutes suffices. Sintering progresses when the firing time (baking time) is too long. The firing treatment has to be conducted with attention to internally retained water vapor. So as to inhibit the adverse effect of the moisture arising during the change from iron oxy-hydroxide to iron oxide, the atmosphere is preferably adjusted to reduce the water vapor density to the lowest level possible. After the prescribed treatment has been completed, the product is removed into room-temperature air and cooled to afford acicular iron oxide powder.

The atmosphere during firing requires management of not only water vapor density but also oxygen density. A more firmly fired iron oxide can be produced by carrying out the firing at a low oxygen density at the start of the firing. The atmosphere is therefore preferably given a low oxygen density or made oxygen free at the start of the firing.

At this time, since, as explained earlier, the surfaces of the iron oxy-hydroxide particles are adhered with phosphorus compound and, optionally, rare earth element compound, the dehydration reaction from iron oxy-hydroxide to iron oxide progresses at a lower temperature than in the case where an element like Al is contained internally. Owing to this, and also to the presence of these compounds on the surface, undesirable sintering among the particles can be restrained. The iron oxide powder surface-coated with phosphorus and at least one rare earth element in the foregoing manner therefore enables formation of a coated film having excellent surface smoothness and also exhibiting superior film strength and durability. It thus constitutes a nonmagnetic powder for forming an underlayer that is suitable for a high-capacity recording medium.

The acicular iron oxide powder according to the present invention also preferably has the following characteristics in addition to those set out above.

Stearic acid adsorption amount: 0.1-3.0 mg/m$^2$, preferably 0.1-2.0 mg/m$^2$, more preferably 0.1-1.5 mg/m$^2$. The smaller the stearic acid adsorption amount is, the smaller is the amount of lubricant (fatty acid) adsorbed during dispersion of the underlayer powder in the paint. As adverse effect on the lubricant therefore decreases with smaller stearic acid adsorption amount, the enhancement of tape durability owing to the lubricant can be maintained.

Resin adsorption amount (MR): 0.1-3 mg/m$^2$, preferably. 0.5-3 mg/m$^2$, more preferably 1-3 mg/m$^2$. A high resin adsorption amount (MR) indicates good resin adherence and improves the coated film strength. A high resin adsorption amount is therefore better.

Resin adsorption amount (UR): 0.1-4 mg/m$^2$, preferably 1.0-4 mg/m$^2$, more preferably 2-4 mg/m$^2$. A high resin adsorption amount (UR) is preferable for the same reasons pointed out with regard to the resin adsorption amount (MR).

Scratch width by steel ball sliding : Not greater than 190 μm, preferably not greater than 170 μm, more preferably not greater than 150 μm. A smaller scratch width indicates higher coated film strength.

Running durability by steel ball sliding: Not less than 600 passes, preferably not less than 900 passes, more preferably not less than 1,500 passes. Running durability is affected by both the coated film strength and the action of the lubricant in the coated film. A coated film capable of maintaining stability against as many sliding movement as possible is preferred.

When a multi-layer structure magnetic recording medium is fabricated to have an underlayer formed using an acicular iron oxide powder according to the present invention, the magnetic powder constituting the upper magnetic layer, the paint composition and the base film can be exemplified as set out below.

Magnetic Powder Constituting Upper Layer:
Magnetic powder
that is a ferromagnetic powder composed chiefly of iron containing
Co: More than 5 to 50 at. %,
Al: 0.1-50 at. %,
At least one rare earth element (defined as including Y) 0.1-30 at %,
At least one periodic table group 1a element (Li, Na, K etc.): not greater than 0.05 wt. %, and
At least one periodic table group 2a element (Mg, Ca, Sr, Ba etc.): not greater than 0.1 wt. %:];
that is an acicular ferromagnetic powder of a shape having
Average major axis length: 10-200 nm,
Specific surface area (BET): 30-150 m$^2$/g, and
X-ray crystal diameter (Dx): 50-200 Angstrom; and
that has magnetic properties of
Coercive force (Hc): 1,000-3,000 Oe, and
Saturated magnetization (ss): 10-200 emu/g.

The base film for forming the multi-layer structure magnetic recording medium can be any of various resin films made of, for example, a polyester such as polyethylene terephthalate or polyethylene naphthalate, or a polyolefin such as cellulose triacetate, polycarbonate, polyamide, polyimide, polyamide-imide, polysulfone-aramid or aromatic polyamide.

Magnetic Paint for Forming Magnetic Layer (Upper Layer):

| Magnetic paint composed of | |
| --- | --- |
| Metal magnetic powder | 100 parts by weight |
| Carbon black | 5 parts by weight |
| Alumina | 3 parts by weight |
| Vinyl chloride resin (MR110) | 15 parts by weight |
| Polyurethane resin (UR8200) | 15 parts by weight |
| Stearc acid | 1 part by weight |
| Acetylacetone | 1 part by weight |
| Methyl ethyl ketone | 190 parts by weight |
| Cyclohexanone | 80 parts by weight |
| Toluene | 110 parts by weight |

Nonmagnetic Paint for Forming the Nonmagnetic Layer (Underlayer):

| Nonmagnetic paint composed of | |
| --- | --- |
| Nonmagnetic powder (a-Fe$_2$O$_3$) | 85 parts by weight |
| Carbon black | 20 parts by weight |
| Alumina | 3 parts by weight |
| Vinyl chloride resin (MR110) | 15 parts by weight |
| Polyurethane resin (UR8200) | 15 parts by weight |
| Methyl ethyl ketone | 190 parts by weight |
| Cyclohexanone | 80 parts by weight |
| Toluene | 110 parts by weight |

Each paint is prepared by blending the materials in ratios to obtain the aforesaid composition and then kneaded/dispersed using a kneader and a sand grinder to obtain a coating liquid. The obtained paint is applied onto the base film to the desired thickness. The magnetic layer is oriented while still damp by exposure to a magnetic field, whereafter drying and calendering are conducted to obtain a magnetic tape. By using a ferromagnetic powder, base film and paint composition as exemplified above and forming a nonmagnetic layer using the underlayer powder according to the present invention, it is possible to manufacture a magnetic recording medium suitable for high-density recording that offers a level of performance not found in conventional counterparts.

WORKING EXAMPLES

Typical working examples of the present invention will now be explained. First, however, an explanation will be made regarding determination of the characteristic values in the examples.

Average major axis length, average short minor axis length, and axial ratio: Values obtained by averaging the measured values of 100 particles randomly selected from a transmission electron micrograph of 174,000 magnifications.

Specific surface area: Measured by the BET method.

Powder pH: Measured in accordance with JIS K5101.

Stearic acid adsorption amount: The powder specimen was dispersed in a 2% stearic acid solution (solvent: MEK), the solution was centrifuged, and adsorption amount per unit specific surface area was calculated from the concentration of the supernatant.

Resin adsorption amount (MR): Calculated the same way as stearic acid adsorption amount using a 1% vinyl chloride resin (MR110) solution (solvent: MEK and ketone).

Resin adsorption amount (UR): Calculated the same way as stearic acid adsorption amount using a 2% polyurethane resin (UR8200) solution (solvent: MEK, toluene and MIBK).

Coated film viscosity and tape evaluation was done using an underlayer tape fabricated under the following conditions using a paint prepared from the obtained iron oxide powder under the conditions set out below.

Paint preparation conditions

| The constituents | |
|---|---|
| Iron oxide powder | 100 parts by weight |
| Vinyl chloride resin | 10 parts by weight |
| Polyurethane resin | 10 parts by weight |
| Methyl ethyl ketone | 165 parts by weight |
| Cyclohexanone | 65 parts by weight |
| Toluene | 165 parts by weight |
| Stearic acid | 1 part by weight |
| Acetylacetone | 1 part by weight. | were blended in the indicated number of parts by weight and the result was dispersed in a centrifugal ball mill for 1 hour to obtain a paint. Using an applicator, the paint was applied onto a base film made of polyethylene terephthalate to a target thickness of about 3 μm to form a nonmagnetic underlayer (underlayer tape).

Paint Viscosity: The viscosity of the paint dispersion was measured using an R110 viscometer manufactured by Toki Sangyo Co., Ltd. of Japan.

Surface smoothness (surface roughness): Ra (roughness) of the underlayer tape surface was evaluated by measurement with an ET-30HK 3-D fine profilometer manufactured by Kosaka Kenkyusho Corporation of Japan.

Surface smoothness (glossiness): The glossiness of the underlayer tape was measured at an angle of 60 degrees with a gloss meter.

Coated film strength (steel ball sliding): The coated surface of the underlayer tape was attached to a glass plate with the coated surface facing upward, the glass plate was placed on a horizontal surface, a 5-mm diameter stainless steel ball was placed on the coated surface of the tape, and a vertical load of 5 g was applied to the ball. In this condition, the glass plate was moved back and forth 20 mm in each direction 300 times at a constant horizontal velocity of 2,320 mm/min. After this operation, the width of the scratch left on the tape surface by the SUS steel ball was measured under an optical microscope. Further, the number of passes up to tape exfoliation was determined and defined as the number of sliding passes.

Running durability (steel ball sliding): The number of sliding passes up to detachment of the coated film was measured in the aforesaid steel ball sliding.

EXAMPLE 1

71 g of iron oxy-hydroxide (α-FeOOH) having an average major axis length of 100 nm and a specific surface area (BET) of 125 $m^2/g$ was added in 4 liters of pure water. After being brought to the alkaline side by addition of 200 g of 20 wt. % $NH_3$ water, the slurry was stirred vigorously while being kept at a temperature of 35° C. It was maintained in this state for 30 minutes. Then, still under stirring, 35.56 g of an aqueous solution of yttrium sulfate containing 2.0 wt. % of Y was added and stirring was continued for 15 minutes. Next, still under stirring, 53.31 g of an aqueous solution of phosphoric acid containing 2.0 wt. % of P was added and stirring was continued for 30 minutes to complete the reaction.

The slurry containing the iron oxy-hydroxide surface treated in this manner was washed with water and the wet powder obtained was dried in air at 110° C. until no more water vapor was generated, thereby affording iron oxy-hydroxide coated with an yttrium compound and a phosphorus compound.

Air at 600° C. was introduced into a tube furnace at 5 L/min to prepare it for firing the iron oxy-hydroxide. Then, 50 g of the surface-treated iron oxy-hydroxide was placed in an alumina boat and charged into the tube furnace, where it was held in that state for 30 minutes. The fired product was removed from tube furnace into room-temperature air together with the alumina boat to obtain an iron oxide powder.

The composition of the obtained iron oxide powder determined by chemical analysis, the various properties of the powder determined as explained earlier, and the measured properties of an underlayer tape fabricated using the powder are set out in Table 1.

EXAMPLE 2

Example 1 was repeated except that the aqueous solution of yttrium sulfate was not added. The iron oxide powder obtained was evaluated as described in Example 1. The results are shown in Table 1.

COMPARATIVE EXAMPLE 1

In this Comparative Example, iron oxy-hydroxide coated with an aluminum compound instead of a phosphorus compound and a rare earth element compound was manufactured and the result was fired to obtain an iron oxide powder.

71 g of the same iron oxy-hydroxide starting material as that used in Example 1 was addede in 4 liters of pure water. After being brought to the alkaline side by addition of 200 g of 20 wt. % $NH_3$ water, the slurry was stirred vigorously while being kept at a temperature of 35° C. It was maintained in this state for 30 minutes. Then, still under stirring, 83.62 g of an aqueous solution of aluminum sulfate containing 0.85 wt. % of Al was added and stirring was continued for 30 minutes.

Washing with water, drying and firing were thereafter conducted as in Example 1. The obtained iron oxide powder was evaluated as described in Example 1. The results are shown in Table 1.

COMPARATIVE EXAMPLE 2

In this Comparative Example, iron oxy-hydroxide coated with a Si compound instead of a phosphorus compound and a rare earth element compound was manufactured and the result was fired to obtain an iron oxide powder.

71 g of the same iron oxy-hydroxide starting material as that used in Example 1 was added in 4 liters of pure water. The slurry was stirred vigorously while being kept at a temperature of 35° C. and was maintained in this state for 30 minutes. Then, still under stirring, 35.54 g of an aqueous solution of water glass containing 2.0 wt. % of Si was added. Next, still under stirring, the pH was adjusted to 6 by adding 0.1 mol/L of HCl, and surface coating by Si compound gelation was allowed to proceed. This state was maintained for 30 minutes to complete the reaction.

Washing with water, drying and firing were thereafter conducted as in Example 1. The obtained iron oxide powder was evaluated as described in Example 1. The results are shown in Table 1.

COMPARATIVE EXAMPLE 3

Example 1 was repeated except that only the aqueous solution of yttrium sulfate was added, without adding the aqueous solution of phosphoric acid. The obtained iron oxide powder was evaluated as described in Example 1. The results are shown in Table 1.

COMPARATIVE EXAMPLE 4

The same iron oxy-hydroxide starting material as that used in Example 1 was directly fired under the conditions of Example 1 without being surface treated. The obtained iron oxide powder was evaluated as described in Example 1. The results are shown in Table 1.

TABLE 1

| | Type and amount of iron oxy-hydroxide surface treatment agent | | | | Firing Temp ° C. | Main constituents in iron oxide | | | | | Powder properties | | | |
|---|---|---|---|---|---|---|---|---|---|---|---|---|---|---|
| | P | Y | Al | Si | | P | Y | Al | Si | Na | Ave. major axis length nm | Ave. minor axis length nm | Ave. axial ratio | Specific surface area (BET) $m^2/g$ |
| | Element/FeOOH (wt. %) | | | | | Element/iron oxide (wt. %) | | | | | | | | |
| Comp. Exmp. 1 | — | — | 1 | — | 600 | — | — | 0.95 | — | 0.011 | 85 | 16 | 5.3 | 57 |
| Comp. Exmp. 2 | — | — | — | 1 | 600 | — | — | — | 0.71 | 0.012 | 90 | 16 | 5.6 | 101 |
| Comp. Exmp. 3 | — | 1 | — | — | 600 | — | 1.05 | — | — | 0.011 | 85 | 16 | 5.3 | 62 |
| Comp. Exmp. 4 | — | — | — | — | 600 | — | — | — | — | 0.011 | 90 | 20 | 4.5 | 46 |
| Exmp. 1 | 1.5 | 1 | — | — | 600 | 1.08 | 1.05 | — | — | 0.011 | 90 | 15 | 6.0 | 59 |
| Exmp. 2 | 1.5 | — | — | — | 600 | 1.14 | — | — | — | 0.012 | 85 | 16 | 5.3 | 57 |

| | Powder properties | | | | | | | |
|---|---|---|---|---|---|---|---|---|
| | | Adsorption properties | | | | Tape Test | | |
| | | Stearic acid adsorption amount $mg/m^2$ | MR adsorption amount $mg/m^2$ | UR adsorption amount $mg/m^2$ | Paint viscosity mPa·s | Surface properties | | Tape durability Steel ball sliding Scratch |
| | Powder pH | | | | | Surface roughness Å | Gloss % | width Mm | No. of passes |
| Comp. Exmp. 1 | 8.4 | 1.7 | 1.1 | 2.2 | 177 | 380 | 138 | 210 | 620 |
| Comp. Exmp. 2 | 7.8 | 0.6 | 0.6 | 1.3 | 547 | 330 | 146 | 230 | 480 |
| Comp. Exmp. 3 | 9.3 | 1.6 | 1.3 | 2.4 | 360 | 355 | 160 | 160 | 460 |
| Comp. Exmp. 4 | 8.0 | 2.1 | 1.1 | 2.1 | 85 | 440 | 150 | 420 | 140 |
| Exmp. 1 | 5.8 | 0.7 | 1.6 | 2.6 | 320 | 170 | 195 | 110 | 1020 |
| Exmp. 2 | 5.4 | 0.8 | 1.0 | 2.4 | 410 | 260 | 176 | 130 | 850 |

The following conclusions can be drawn from Table 1.

(1) The P-containing iron oxide powder of Example 2 produced a sinter preventing effect that enhanced the surface smoothness of the underlayer tape. The iron oxide powder of Example 1 added with both P and Y produced a still stronger sinter preventing effect that markedly improved the surface smoothness of the underlayer tape.

(2) The P-containing iron oxide powders of Examples 1 and 2 had low pH values. As their particle surfaces were therefore acidic, the fatty acid adsorption amount (StA. adsorption amount) was held low and adsorption reaction between the iron oxide powder and the lubricant (fatty acid) within the coated film was therefore inhibited. This enabled the lubricant in the tape to thoroughly perform its intended function and resulted in excellent tape durability. Specifically, the scratch width by steel ball sliding was smaller and the number of sliding passes was greater than in the case of the Comparative Examples not containing P, from which it can be seen that inclusion of P markedly improved tape durability.

(3) The iron oxide powder of Comparative Example 3, which contained Y, produced an underlayer tape with better surface smoothness and tape durability than that produced using the iron oxide powder of Comparative Example 4, which contained neither P nor Y. However, these effects were slight in comparison with those of the P-containing iron oxide powder of Example 1. On the other hand, when P and Y were incorporated in combination as in Example 1, a synergistic effect greater than that by Y alone or P alone was manifested that greatly enhanced both the surface properties of the underlayer tape and the tape durability.

EXAMPLE 3

In this Example, a multi-layer structure magnetic tape fabricated to have a nonmagnetic layer formed using the underlayer powder obtained in Example 1 and a magnetic layer formed using the metal magnetic powder set out below was evaluated for electromagnetic conversion characteristics and tape durability.

The nonmagnetic powder paint was prepared by blending 85 parts by weight of the underlayer powder obtained in Example 1 with the components set out below in the indicated number of parts by weight, followed by kneading and dispersing using a kneader and a sand grinder.

Nonmagnetic Paint Composition

| | |
|---|---|
| Underlayer powder of Example 1 (a-Fe$_2$O$_3$) | 85 parts by weight |
| Carbon black | 20 parts by weight |
| Alumina | 3 parts by weight |
| Vinyl chloride resin (MR110) | 15 parts by weight |
| Polyurethane resin (UR8200) | 15 parts by weight |
| Methyl ethyl ketone | 190 parts by weight |
| Cyclohexanone | 80 parts by weight |
| Toluene | 110 parts by weight |

The magnetic powder paint was prepared by blending 100 parts by weight of the metal magnetic powder set out below with the components set out below in the indicated number of parts by weight, followed by kneading and dispersing using a kneader and a sand grinder.

Metal Magnetic Powder
 Major axis length: 60 nm
 BET: 63 m$^2$/g
 Dx: 140 Angstrom
 Hc: 2,100 (Oe)
 ss: 123 emu/g Magnetic Paint Composition

| | |
|---|---|
| Metal magnetic powder shown above: | 100 parts by weight |
| Carbon black | 5 parts by weight |
| Alumina | 3 parts by weight |
| Vinyl chloride resin (MR110) | 15 parts by weight |
| Polyurethane resin (UR8200) | 15 parts by weight |
| Stearic acid | 1 part by weight |
| Acetylacetone | 1 part by weight |
| Methyl ethyl ketone | 190 parts by weight |
| Cyclohexanone | 80 parts by weight |
| Toluene | 110 parts by weight |

These paints were applied onto a base film composed of an aramid support to obtain a nonmagnetic layer (underlayer) thickness of 2.0 μm and a magnetic layer thickness of 0.20 μm. The magnetic layer was oriented while still damp by exposure to a magnetic field, whereafter drying and calendering were conducted to obtain a magnetic tape.

The obtained magnetic tape was tested for surface smoothness (roughness) and tape durability (number of steel ball sliding passes) by the methods explained earlier. The magnetic conversion properties (C/N and output) of the tape were also measured. In C/N ratio measurement, a recording head was attached to a drum tester and a digital signal was recorded at a recording wavelength of 0.35 μm. At this time, an MR head was used to measure the reproduced signal and noise was measured as modulation noise. In evaluation, the output when using the iron oxide powder of Comparative Example 5 was defined as 0 dB and the measured values represented relative to this value. The results are shown in Table 2.

COMPARATIVE EXAMPLE 5

Example 3 was repeated except that the iron oxide powder obtained in Comparative Example 1 was used as the underlayer powder. The surface smoothness (roughness), tape durability (number of steel ball sliding passes) and electromagnetic conversion characteristics of the obtained magnetic tape are shown in Table 2.

TABLE 2

| Multi-layer structure magnetic tape | Underlayer powder used | Surface smoothness Roughness (Å) | Electromagnetic conversion characteristics | | Tape durability Steel ball sliding passes |
|---|---|---|---|---|---|
| | | | Output | C/N | |
| Example 3 | Example 1 | 95 | +0.9 dB | +2.2 dB | 1,340 times |
| Comparative Example 5 | Comparative Example 1 | 220 | 0 dB | 0 dB | 670 times |

It can be seen from Table 2 that a multi-layer structure magnetic tape manufactured using an underlayer powder according to the present invention exhibited excellent surface smoothness and, as a result, high output and high C/N that made it suitable for use as a high-density recording medium. The magnetic tape was also excellent in durability and in durability against sliding relative to a head.

EXAMPLE 4

Example 1 was repeated except that the iron oxy-hydroxide (α-FeOOH) used at the start had an average major axis length of 30 nm and a specific surface area (BET) of 195 m²/g. The iron oxide powder obtained was evaluated as described in Example 1. The results are shown in Table 3.

EXAMPLE 5

Example 1 was repeated except that the iron oxy-hydroxide (α-FeOOH) used at the start had an average major axis length of 210 nm and a specific surface area (BET) of 70 m²/g. The iron oxide powder obtained was evaluated as described in Example 1. The results are shown in Table 3.

COMPARATIVE EXAMPLE 6

Example 1 was repeated except that the iron oxy-hydroxide (α-FeOOH) used at the start had an average major axis length of 20 nm and a specific surface area (BET) of 230 m²/g. The iron oxide powder obtained was evaluated as described in Example 1. The results are shown in Table 3.

COMPARATIVE EXAMPLE 7

Example 1 was repeated except that the iron oxy-hydroxide (α-FeOOH) used at the start had an average major axis length of 280 nm and a specific surface area (BET) of 49 m²/g. The iron oxide powder obtained was evaluated as described in Example 1. The results are shown in Table 3.

EXAMPLE 6

Example 1 was repeated except that the added amount of aqueous solution of phosphoric acid containing 2.0 wt. % of P was changed to 277.21 g. The iron oxide powder obtained was evaluated as described in Example 1. The results are shown in Table 3.

EXAMPLE 7

Example 1 was repeated except that the added amount of aqueous solution of phosphoric acid containing 2.0 wt. % of P was changed to 191.92 g. The iron oxide powder obtained was evaluated as described in Example 1. The results are shown in Table 3.

EXAMPLE 8

Example 1 was repeated except that the added amount of aqueous solution of phosphoric acid containing 2.0 wt. % of P was changed to 28.43 g. The iron oxide powder obtained was evaluated as described in Example 1. The results are shown in Table 3.

EXAMPLE 9

Example 1 was repeated except that the added amount of aqueous solution of phosphoric acid containing 2.0 wt. % of P was changed to 14.22 g. The iron oxide powder obtained was evaluated as described in Example 1. The results are shown in Table 3.

COMPARATIVE EXAMPLE 8

Example 1 was repeated except that the added amount of aqueous solution of phosphoric acid containing 2.0 wt. % of P was changed to 312.75 g. The iron oxide powder obtained was evaluated as described in Example 1. The results are shown in Table 3.

EXAMPLE 10

Example 1 was repeated except that the added amount of aqueous solution of yttrium sulfate containing 2.0 wt. % of Y was changed to 7.11 g. The iron oxide powder obtained was evaluated as described in Example 1. The results are shown in Table 3.

EXAMPLE 11

Example 1 was repeated except that the added amount of aqueous solution of yttrium sulfate containing 2.0 wt. % of Y was changed to 284.48 g. The iron oxide powder obtained was evaluated as described in Example 1. The results are shown in Table 3.

COMPARATIVE EXAMPLE 9

Example 1 was repeated except that the added amount of aqueous solution of yttrium sulfate containing 2.0 wt. % of Y was changed to 533.40 g. The iron oxide powder obtained was evaluated as described in Example 1. The results are shown in Table 3.

EXAMPLE 12

Example 1 was repeated except that the aqueous solution of phosphoric acid containing 2.0 wt. % of P was replaced with an aqueous solution of sulfuric acid containing 2.0 wt. % of sulfuric acid. The iron oxide powder obtained was evaluated as described in Example 1. The results are shown in Table 3.

EXAMPLE 13

Example 1 was repeated except that the aqueous solution of phosphoric acid containing 2.0 wt. % of P was replaced with an aqueous solution of hydrochloric acid containing 2.0 wt. % of hydrochloric acid. The iron oxide powder obtained was evaluated as described in Example 1. The results are shown in Table 3.

EXAMPLE 14

71 g of iron oxy-hydroxide (α-FeOOH) having an average major axis length of 130 nm and a specific surface area (BET) of 85 m²/g was added to 4 liters of pure water. 200 g of 20 wt. % $NH_3$ water was added under vigorous stirring to prepare a suspension whose liquid was on the alkaline side.

35.56 g of an aqueous solution of yttrium sulfate containing 2.0 wt. % of Y was added to the suspension and stirring was continued for 15 minutes. The obtained iron oxy-hydroxide containing yttrium was filtered from the suspension and washed with water. Phosphorus was then adhered to the obtained filtered and washed product by impregnating it with an aqueous solution of phosphoric acid containing about 2.0 wt. % of P for an impregnation period adjusted so that the phosphorus content of the iron oxy-hydroxide became 1.4 wt. %. The result was washed with water and then dewatered/dried at 300° C. to afford iron oxy-hydroxide coated with an yttrium compound and a phosphorus compound.

The iron oxy-hydroxide was next fired. The firing was conducted in a tube furnace, first by heat treatment for about 20 minutes at a temperature of 590° C. in nitrogen gas containing 10% water vapor and then by heat treatment for 20 minutes in an air atmosphere, also at a temperature of 590° C., whereafter the product was removed from the tube furnace into room-temperature air to obtain an iron oxide powder. The iron oxide powder obtained was evaluated as described in Example 1. The results are shown in Table 3.

EXAMPLE 15

Example 14 was repeated except that the period of impregnating the filtered and washed product with the phosphorus-containing aqueous solution period was adjusted so that the phosphorus content of the iron oxy-hydroxide became 0.8 wt. %. The iron oxide powder obtained was evaluated as described in Example 1. The results are shown in Table 3.

TABLE 3

| | Type and amount of iron oxy-hydroxide surface treatment agent | | | | | Main constituents in iron oxide | | | | | Powder properties | | | | |
|---|---|---|---|---|---|---|---|---|---|---|---|---|---|---|---|
| | P | Y | Al | Si | Firing Temp ° C. | P | Y | Al | Si | Na | Ave. major axis length nm | Ave. minor axis length nm | Ave. axial ratio | Specific surface area (BET) m²/g | Powder pH |
| | Element/FeOOH (wt. %) | | | | | Element/iron oxide (wt. %) | | | | | | | | | |
| Exmp. 4 | 1.5 | 1 | — | — | 600 | 1.10 | 1.05 | — | — | 0.011 | 23 | 6 | 3.3 | 98 | 5.7 |
| Exmp. 5 | 1.5 | 1 | — | — | 600 | 1.09 | 1.04 | — | — | 0.011 | 195 | 30 | 6.6 | 30 | 5.9 |
| Exmp. 6 | 7.8 | 1 | — | — | 600 | 4.90 | 1.05 | — | — | 0.011 | 95 | 14 | 6.8 | 94 | 3.2 |
| Exmp. 7 | 5.4 | 1 | — | — | 600 | 3.20 | 1.05 | — | — | 0.011 | 93 | 14 | 6.6 | 73 | 4.2 |
| Exmp. 8 | 0.8 | 1 | — | — | 600 | 0.52 | 1.04 | — | — | 0.011 | 90 | 15 | 6.0 | 58 | 6.2 |
| Exmp. 9 | 0.4 | 1 | — | — | 600 | 0.21 | 1.04 | — | — | 0.011 | 85 | 16 | 5.3 | 59 | 6.4 |
| Exmp. 10 | 1.5 | 0.2 | — | — | 600 | 1.08 | 0.23 | — | — | 0.011 | 90 | 15 | 6.0 | 59 | 5.8 |
| Exmp. 11 | 1.5 | 8 | — | — | 600 | 1.08 | 8.01 | — | — | 0.011 | 90 | 15 | 6.0 | 64 | 5.7 |
| Exmp. 12 | S: 1.5 | 1 | — | | 600 | S: 1.00 | 1.03 | — | — | 0.011 | 80 | 18 | 4.4 | 48 | 5.1 |
| Exmp. 13 | Cl: 1.5 | 1 | — | | 600 | Cl: 1.1 | 1.04 | — | — | 0.011 | 75 | 20 | 3.8 | 45 | 4.7 |
| Exmp. 14 | 2.2 | 1 | — | | 590 | 1.50 | 1.01 | — | — | 0.011 | 110 | 28 | 4.0 | 71 | 6.3 |
| Exmp. 15 | 1.5 | 1 | — | | 590 | 0.90 | 1.02 | — | — | 0.011 | 110 | 28 | 4.0 | 66 | 6.9 |
| Comp. Exmp. 6 | 1.5 | 1 | — | | 600 | 1.09 | 1.05 | — | — | 0.011 | 15 | 5 | 2.0 | 112 | 5.9 |
| Comp. Exmp. 7 | 1.5 | 1 | — | | 600 | 1.10 | 1.06 | — | — | 0.011 | 246 | 32 | 7.8 | 22 | 5.8 |
| Comp. Exmp. 8 | 8.8 | 1 | — | | 600 | 5.40 | 1.04 | — | — | 0.011 | 95 | 14 | 6.8 | 104 | 2.8 |
| Comp. Exmp. 9 | 1.5 | 15 | — | | 600 | 1.08 | 14.9 | — | — | 0.011 | 90 | 15 | 6.0 | 75 | 5.6 |

| | Powder properties Adsorption properties | | | | Tape Test | | | |
|---|---|---|---|---|---|---|---|---|
| | Stearic acid adsorption amount mg/m² | MR adsorption amount mg/m² | UR adsorption amount mg/m² | Paint viscosity mPa·s | Surface properties | | Tape durability Steel ball sliding Scratch | |
| | | | | | Surface roughness Å | Gloss % | width μm | No. of passes |
| Exmp. 4 | 0.6 | 1.6 | 2.5 | 730 | 170 | 190 | 120 | 1000 |
| Exmp. 5 | 0.9 | 1.4 | 2.6 | 270 | 260 | 182 | 100 | 1050 |
| Exmp. 6 | 0.3 | 1.4 | 2.5 | 640 | 220 | 180 | 100 | 1040 |
| Exmp. 7 | 0.4 | 1.5 | 2.5 | 400 | 160 | 195 | 105 | 1100 |
| Exmp. 8 | 1.1 | 1.5 | 2.4 | 310 | 160 | 185 | 120 | 1005 |
| Exmp. 9 | 1.2 | 1.6 | 2.5 | 330 | 220 | 180 | 125 | 970 |
| Exmp. 10 | 0.8 | 1 | 2.4 | 320 | 200 | 185 | 120 | 960 |
| Exmp. 11 | 0.7 | 1.5 | 2.5 | 340 | 190 | 185 | 115 | 1010 |
| Exmp. 12 | 0.4 | 1.6 | 2.6 | 260 | 280 | 170 | 160 | 850 |
| Exmp. 13 | 0.3 | 1.6 | 2.6 | 250 | 290 | 170 | 160 | 880 |
| Exmp. 14 | 0.7 | 0.9 | 1.7 | 50 | 220 | 170 | 110 | 1020 |
| Exmp. 15 | 0.9 | 0.9 | 1.7 | 45 | 230 | 170 | 115 | 990 |
| Comp. Exmp. 6 | 0.6 | 1.5 | 2.5 | 960 | Tape making impossible | | | |
| Comp. Exmp. 7 | 0.9 | 1.6 | 2.6 | 260 | 400 | 120 | 120 | 1010 |
| Comp. Exmp. 8 | 0.2 | 1.4 | 2.6 | 700 | 380 | 160 | 90 | 1080 |
| Comp. Exmp. 9 | 0.6 | 1.5 | 2.6 | 370 | 270 | 160 | 120 | 990 |

The following conclusions can be drawn from Table 3 (also see Table 1).

(1) Looking at the average major axis length of the iron oxide (hematite) powders, it is found that the average major axis length was larger in the order of Comparative Example 6, Example 4, Example 1, Example 5 and Comparative Example 7, but that in the case of the small particles of an average major axis length of under 20 nm of Comparative Example 6, the specific surface area (BET) rose to an extremely high value of 112 $m^2/g$ that made the viscosity too high at the time of coating, with the result that the ensuing coating became difficult (tape making was impossible). On the other hand, in the case of the particles of an average major axis length of 246 nm of Comparative Example 7, the coarseness of the particles resulted in loss of surface smoothness. In contrast, the iron oxide powders of the Examples, with average major axis lengths in the range of 20-200 nm, achieved good results. It can thus be seen that a particle average major axis length of 20-200 nm is suitable for an underlayer material excellent in surface smoothness and tape durability.

(2) Looking the phosphorus content of the iron oxide (hematite) powders, it is found that the phosphorus content was lower in the order of Comparative Example 8, Example 6, Example 7, Example 1, Example 8, Example 9 and Comparative Example 3, but that in Comparative Example 8 and other cases where the phosphorus content was high, the specific surface area (BET) tended to increase, so that dispersion was inadequate at the time of coating and the surface smoothness of the tape tended to decline as a result. On the other hand, when the phosphorus content was decreased, the sinter preventing effect during firing became insufficient, so that sintering occurred among the particles to make dispersion at the time of coating difficult and thus cause loss of surface smoothness. The coating strength effect was not thoroughly manifested at this time and tape durability declined as a result. It can therefore be seen that a phosphorus content in the range of 0.1-5.0 wt. % is suitable for an underlayer material excellent in surface smoothness and tape durability.

(3) Examples 12 and 13 are cases in which the pH of the iron oxide (hematite) powder was lowered without using phosphoric acid, by treatment with sulfuric acid and hydrochloric acid. From a comparison with Comparative Example 3 in which no acid treatment was carried out, it can be seen that some amount of sinter preventing effect was exhibited and surface smoothness improvement achieved even when the pH was lowered using sulfuric acid or hydrochloric acid. However, the iron oxides obtained using sulfuric acid or hydrochloric acid were inferior in sinter preventing effect to that obtained using phosphoric acid in Example 1 and the surface smoothness was lower as a result. Regarding the tape durability of the products of Examples 12 and 13, there was noted a tendency for the scratch width by steel ball sliding to decrease and the number of passes to increase owing to decrease in the stearic acid adsorption amount. It can therefore be seen that a powder pH of not greater than 7 is suitable for an underlayer material excellent in surface smoothness and tape durability and that while sulfur, chlorine and phosphorus could be used as substances incorporated for this purpose, phosphorus was found preferable.

(4) Examples 14 and 15 differ from Example 1 in the point that they utilized a method of impregnating the filtered water-containing product with a phosphoric acid solution rather than utilizing the Example 1 method of conducting the phosphoric acid treatment by reaction in a liquid. It was found, however, that an underlayer material excellent in surface smoothness and tape durability like that of Example 1 could also be obtained by the method of impregnation with a phosphoric acid solution.

As explained in the foregoing, the present invention provides an iron oxide powder that enhances the properties required of a powder for forming the underlayer of a multi-layer structure coating-type magnetic recording medium, most notably the surface smoothness and strength of the tape. Use of the iron oxide powder of the present invention as a powder for forming the underlayer of a multi-layer structure coating-type magnetic recording medium therefore makes it possible to obtain a durable recording medium suitable for high-density recording.

What is claimed is:

1. A powder for an underlayer of a coating-type magnetic recording medium, which powder comprises non-magnetic acicular iron oxide particles having an average major axis length in the range of 20-200 nm, has a specific surface area measured by the BET method of 30-100 $m^2/g$ and has a powder pH of not greater than 7, wherein said powder contains 0.1-5.0 wt. % of P and an amount of R (where R represents one or more rare earth elements, defined as including Y) such that R/Fe expressed in atomic percentage (at. %) is 0.1-10 at. %.

2. A coating-type magnetic recording medium constituted as a multi-layer structure coating-type magnetic recording medium consisting of a magnetic layer composed of magnetic powder dispersed in resin, a base film, and a nonmagnetic layer (underlayer) composed of nonmagnetic powder dispersed in a resin that is located between the magnetic layer and the base film, wherein the nonmagnetic powder is a powder for an underlayer defined in claim 1.

* * * * *